(12) United States Patent
Beglin et al.

(10) Patent No.: US 7,979,401 B2
(45) Date of Patent: Jul. 12, 2011

(54) TIME BASED FILE SYSTEM FOR CONTINUOUS DATA PROTECTION

(75) Inventors: Thomas William Beglin, Tucson, AZ (US); Kenneth Wayne Boyd, Tucson, AZ (US); Kenneth Fairclough Day, III, Tucson, AZ (US); Douglas William Dewey, Tucson, AZ (US)

(73) Assignee: International Business Macines Corporation, Armonk, NY (US)

( * ) Notice: Subject to any disclaimer, the term of this patent is extended or adjusted under 35 U.S.C. 154(b) by 428 days.

(21) Appl. No.: 12/147,384

(22) Filed: Jun. 26, 2008

(65) Prior Publication Data

US 2009/0327357 A1    Dec. 31, 2009

(51) Int. Cl.
*G06F 17/00* (2006.01)
*G06F 7/00* (2006.01)
*G06F 17/30* (2006.01)

(52) U.S. Cl. .................. 707/674; 707/661; 707/822

(58) Field of Classification Search .................. None
See application file for complete search history.

(56) References Cited

U.S. PATENT DOCUMENTS

| | | | |
|---|---|---|---|
| 5,537,636 A * | 7/1996 | Uchida et al. ............... | 1/1 |
| 5,678,042 A | 10/1997 | Pisello et al. | |
| 5,819,292 A | 10/1998 | Hitz et al. | |
| 5,845,240 A * | 12/1998 | Fielder ............... | 704/201 |
| 6,895,490 B1 | 5/2005 | Moore et al. | |
| 7,051,050 B2 | 5/2006 | Chen et al. | |
| 2004/0186858 A1 | 9/2004 | McGovern et al. | |
| 2005/0240636 A1 | 10/2005 | Shitomi et al. | |

OTHER PUBLICATIONS

M.A. Olson, "The Design and Implementation of the Inversion File System", 1993 Winter USENIX—Jan. 25-29, 1993, San Diego, CA, pp. 1-14.

G. Russo et al., "An Operating System Independent WORM Archival System", Software-Practice and Experience, vol. 25(5), pp. 521-531, May 1995.

* cited by examiner

*Primary Examiner* — Uyen T. Le
(74) *Attorney, Agent, or Firm* — Rabindranath Dutta; Konrad Raynes & Victor LLP (57) ABSTRACT

Tokens corresponding to data units written to a rewritable file system are stored, where an ordering relationship is maintained among the tokens, where the ordering relationship is such that a first token corresponding to a first data unit is of a lesser numerical value in comparison to a second token corresponding to a second data unit, and where the first data unit is written at an earlier point in time in comparison to the second data unit. The rewritable file system is reverted to an indicated point in time based on the ordering relationship that is maintained among the stored tokens.

20 Claims, 6 Drawing Sheets

TIME BASED FILE SYSTEM FOR CONTINUOUS DATA PROTECTION

BACKGROUND

1. Field

The disclosure relates to a method, system, and article of manufacture for a time based file system for continuous data protection.

2. Background

In certain situations, it is useful to take "snapshot" copies of a file system at a different points-in-time and subsequently restore the file system to a prior state after the file system has been altered. A snapshot copy represents the state of the file system at the time the snapshot copy was taken.

The snapshot granularity may be fixed and may be determined a priori and may be explicitly triggered or scheduled. Certain systems copy existing data to a new area on a disk before writing new data in the same place where the old data resided. This type of "copy-on-write" may impact performance of such systems.

SUMMARY OF THE PREFERRED EMBODIMENTS

Provided are a method, system, and article of manufacture, wherein a plurality of tokens corresponding to a plurality of data units written to a rewritable file system is stored, wherein an ordering relationship is maintained among the plurality of tokens, wherein the ordering relationship is such that a first token corresponding to a first data unit is of a lesser numerical value in comparison to a second token corresponding to a second data unit, and wherein the first data unit is written at an earlier point in time in comparison to the second data unit. The rewritable file system is reverted to an indicated point in time based on the ordering relationship that is maintained among the stored plurality of tokens.

In certain embodiments, the storing of the plurality of tokens further comprises generating the plurality of tokens with numerical values in a monotonically increasing order as the plurality of data units are written into the rewritable file system, and writing timestamps in association with the plurality of data units, wherein a timestamp indicates a chronological time at which a data unit is written.

In additional embodiments, the reverting further comprises receiving a request to revert the rewritable file system to the indicated point in time, wherein the indicated point in time is provided by a user. A determination is made as to which token has a highest numerical value at the indicated point in time based on the timestamps written in association with the plurality of data units. Only data units with corresponding tokens having a numerical value less than or equal to the numerical value of the determined token are used to recreate directories and files at the indicated point in time.

In yet additional embodiments, the storing and reverting are performed by a file system driver, and wherein the file system driver comprises: a token generator application that generates the plurality of tokens having monotonically increasing numerical values; a data unit writing application that writes the plurality of data units to a storage device and associates the plurality of data units with the plurality of tokens; a token to user time association application that determines which token has a highest numerical value corresponding to the indicated point in time; and a file system reversion application that reverts the rewritable file system to the indicated point in time by using a selected set of tokens of the plurality of tokens.

In still further embodiments, a device on which the rewritable file system is implemented is selected from one of a write once read many storage device and a rewritable storage device, wherein no data that has been written can be physically deleted from the write once read many storage device, wherein data that has been written can be physically deleted from the rewritable storage device, and wherein continuous data protection is provided by allowing the rewritable file system to be reverted to any prior point in time.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
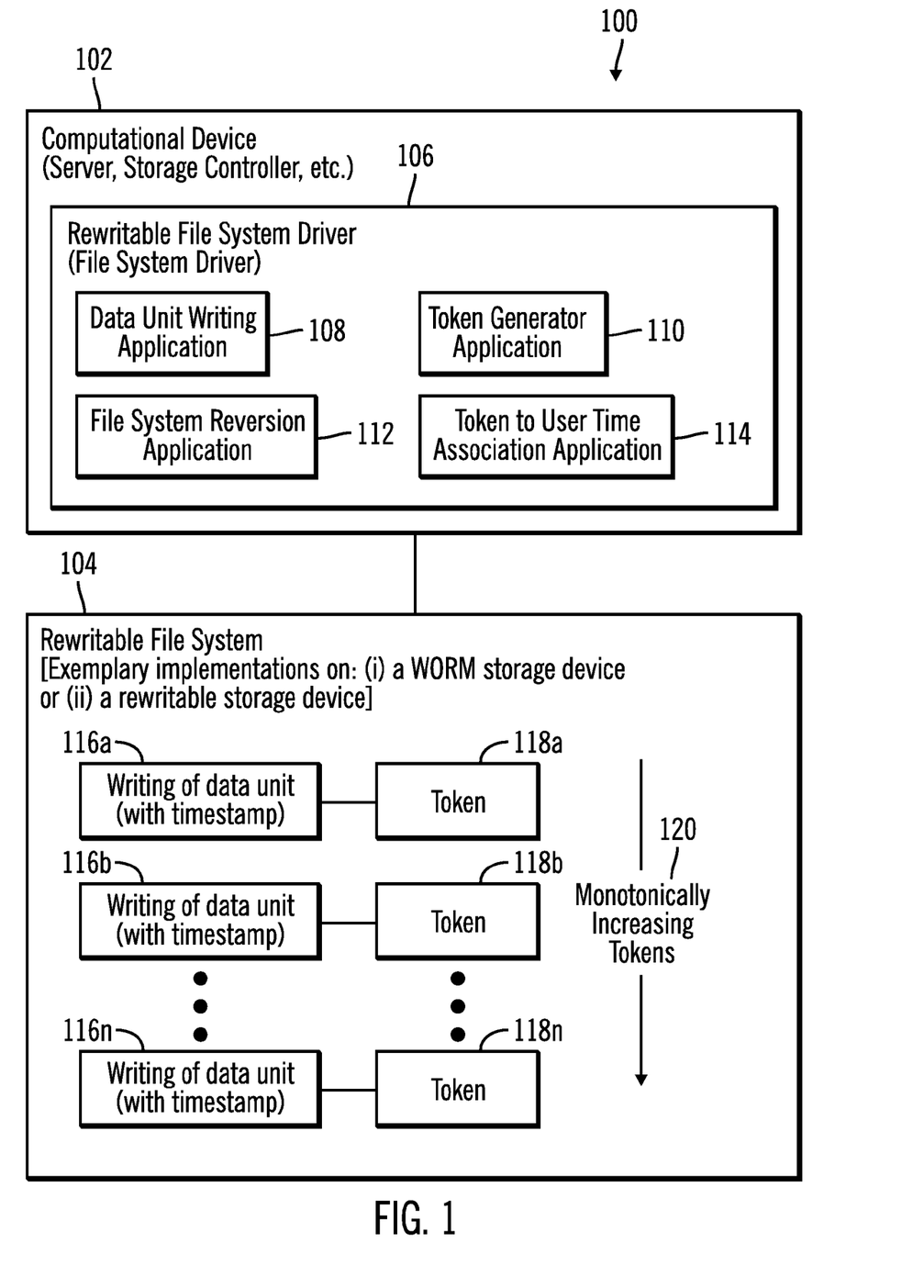
FIG. 1 illustrates a block diagram of a computing environment comprising a computational device and a rewritable file system in accordance with certain embodiments.

FIG. 1 illustrates a block diagram of a computing environment 100 comprising a computational device 102 and a rewritable file system 104 in accordance with certain embodiments. The computational device 102 may comprise any suitable computational platform, including those presently known in the art, such as, a server, a storage controller, a personal computer, a workstation, a mainframe, a midrange computer, a network appliance, a palm top computer, a telephony device, a blade computer, a hand held computer, etc. The rewritable file system 104 may comprise any suitable rewritable file system, i.e., a file system in which data can be rewritten, wherein the rewritable file system 104 may be implemented on any rewritable storage device, such as a hard disk, a tape, etc. In certain alternative embodiments, the rewritable file system 104 may be implemented on a Write Once Read Many (WORM) storage device.

The computational device 102 includes a rewritable file system driver 106 corresponding to the rewritable file system 104. The rewritable file system drive 106 is any suitable file system driver and may comprise a data unit writing application 108, a token generator application 110, a file system reversion application 112, and a token to user time association application 114.

The data unit writing application 108 writes a plurality of data units 116*a*, 116*b*, . . . 116*n* to the rewritable file system, wherein timestamps that indicate the time at which a data unit is written may also be written in association with the data units 116a, 116b, . . . 116n. The token generator application 110 may generate tokens 118a, 118b, . . . , 118n that are in a monotonically increasing order as indicated by reference numeral 120. The token to user time association application 114 may associate the tokens 118a, 118b . . . , 118n with the timestamps of the data units 116a, 116b, . . . , 116n. For example, token 118a may be associated with data unit 116a, token 118b may be associated with data unit 116b, and token 118n may be associated with data unit 116n.

The file system reversion application 112 reverts the rewritable file system 104 to an earlier point time in time.

Figure 2:
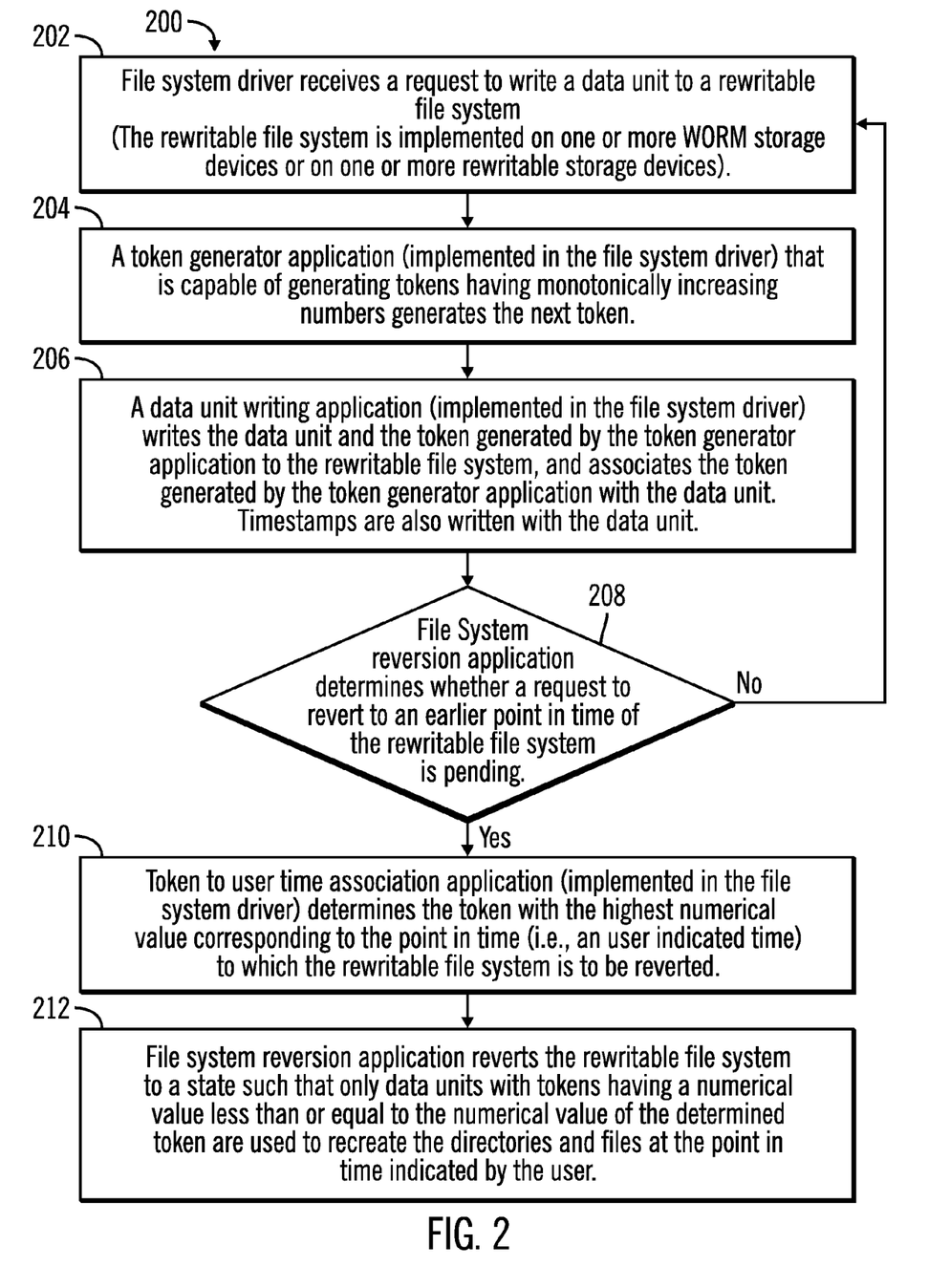
FIG. 2 illustrates first operations for reverting a rewritable file system to an earlier point in time, in accordance with certain embodiments.

FIG. 2 illustrates first operations 200 for reverting the rewritable file system 104 to an earlier point in time, in accordance with certain embodiments. The first operations 200 may be implemented in the computational device 102.

Control starts at block 202, where the file system driver 106 receives a request to write a data unit to the rewritable file system 104. The data unit may comprise any unit of data, such as a byte, a record, a block, etc. The rewritable file system 104 is implemented on one or more WORM storage devices or on one or more rewritable storage devices.

Control proceeds to block 204, where the token generator application 110 (implemented in the file system driver 106) that is capable of generating tokens having monotonically increasing numbers generates the next token. The data unit writing application 108 (implemented in the file system driver 106) writes (at block 206) the data unit and the token generated by the token generator application 110 to the rewritable file system 104, and associates the token generated by the token generator application 110 with the data unit. Timestamps are also written with the data unit.

Control proceeds to block 208, where the file system reversion application 112 determines whether a request to revert to an earlier point in time of the rewritable file system is pending. If so, then the token to user time association application 114 (implemented in the file system driver 106) determines (at block 210) the token with the highest numerical value corresponding to the point in time to which the rewritable file system 104 is to be reverted. The point in time may be a user indicated time. The file system reversion application 112 reverts (at block 212) the rewritable file system 104 to a state such that only data units with tokens having a numerical value less than or equal to the numerical value of the determined token are used to recreate the directories and files at the point in time indicated by the user.

If at block 208, the file system reversion application 112 determines that a request to revert to an earlier point in time of the rewritable file system is not pending then control returns to block 202 where the file system driver 106 receives additional requests to write data units to the rewritable file system 104.

Therefore, FIG. 2 illustrates certain embodiments in which a rewritable file system is reverted to an earlier point in time based on values of monotonically increasing tokens associated with data units written in the rewritable file system, wherein the tokens are associated with timestamps.

Figure 3:
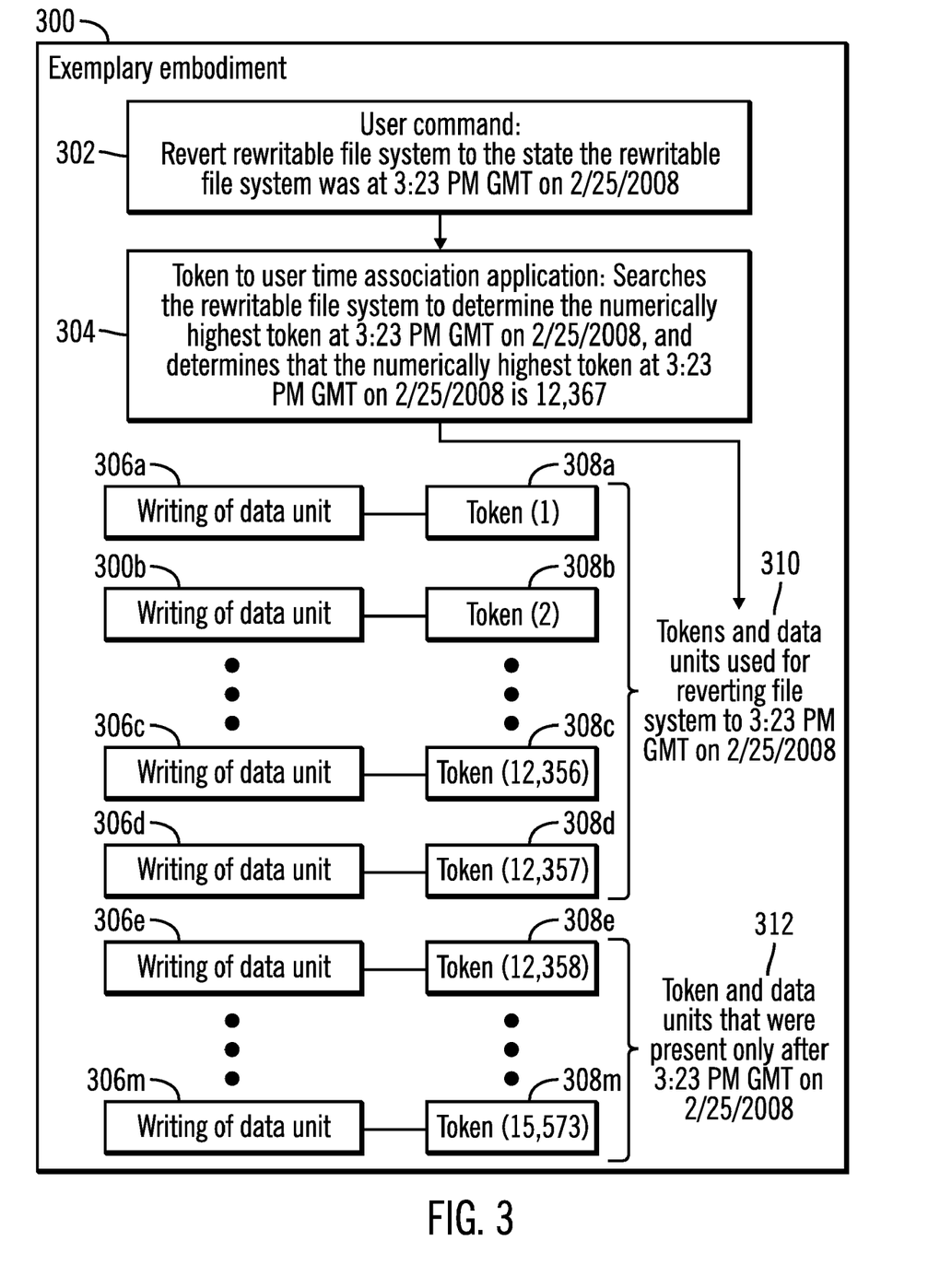
FIG. 3 a block diagram that shows how to revert a rewritable file system to the state the rewritable file system was at a selected time, in accordance with certain embodiments.

FIG. 3 a block diagram that shows how to revert an exemplary rewritable file system to the state the rewritable file system was at a selected time, in accordance with an exemplary embodiment 300.

A user command 302 may request reversion of the rewritable file system 104 to the state the rewritable file system 104 was at 3:23 PM GMT on Feb. 25, 2008. Block 304, shows that the token to user time association application 114 searches the rewritable file system 104 to determine the numerically highest token at 3:23 PM GMT on Feb. 25, 2008, and determines that the numerically highest token at 3:23 PM GMT on Feb. 25, 2008 is 12,367 (indicated by reference numeral 308d, wherein the data units 306a, 306b, . . . , 306c, 306d, 306e, . . . , 306m are associated with tokens 308a, 308b, . . . , 308c, 308d, 308e, . . . , 308m as shown in FIG. 3). FIG. 3 shows that token 308a has value 1, token 308b has value 2, token 308c has value 12,356, token 308d has value 12,357, token 308e has value 12,358 and token 308m has valued 15,573.

The file system reversion application 112 uses (reference numeral 310) the tokens 308a, 308b, . . . 308c, 308d and data units 306a, 306b, . . . 306c, 306d for reverting the rewritable files system 104 to 3:23 PM GMT on Feb. 25, 2008. It can be seen from block 312 of FIG. 3 that tokens 308e . . . 308m and data units 306e . . . 306m were present only after 3:23 PM GMT on Feb. 25, 2008.

Therefore, FIG. 3 illustrates an exemplary embodiment in which a rewritable file system 104 is reverted to a state at a particular point in time by determining the numerically highest token at that particular point in time and using the determined token to revert the file system to the particular point in time.

Figure 4:
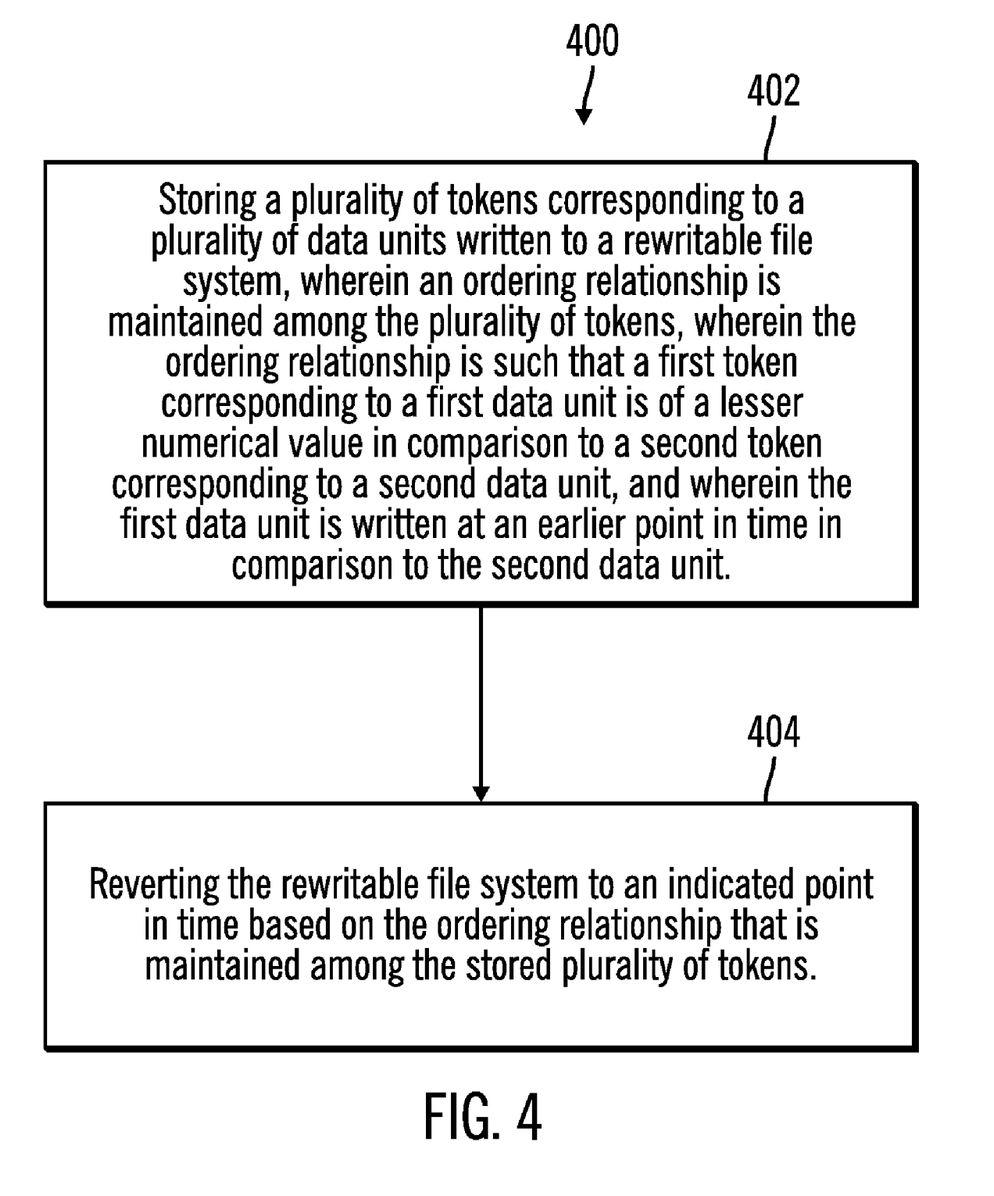
FIG. 4 illustrates second operations for reverting a rewritable file system to an earlier point in time, in accordance with certain embodiments.

FIG. 4 illustrates second operations 500 for reverting the rewritable file system 104 to an earlier point in time, in accordance with certain embodiments. The second operations 400 may be implemented in the computational device 102.

Control starts at block 402, wherein a plurality of tokens 118a . . . 118n corresponding to a plurality of data units 116a . . . 116n written to a rewritable file system 104 is stored, wherein an ordering relationship is maintained among the plurality of tokens 118a . . . 118n, wherein the ordering relationship is such that a first token corresponding to a first data unit is of a lesser numerical value in comparison to a second token corresponding to a second data unit, and wherein the first data unit is written at an earlier point in time in comparison to the second data unit.

The rewritable file system 104 is reverted (at block 404) to an indicated point in time based on the ordering relationship that is maintained among the stored plurality of tokens.

Figure 5:
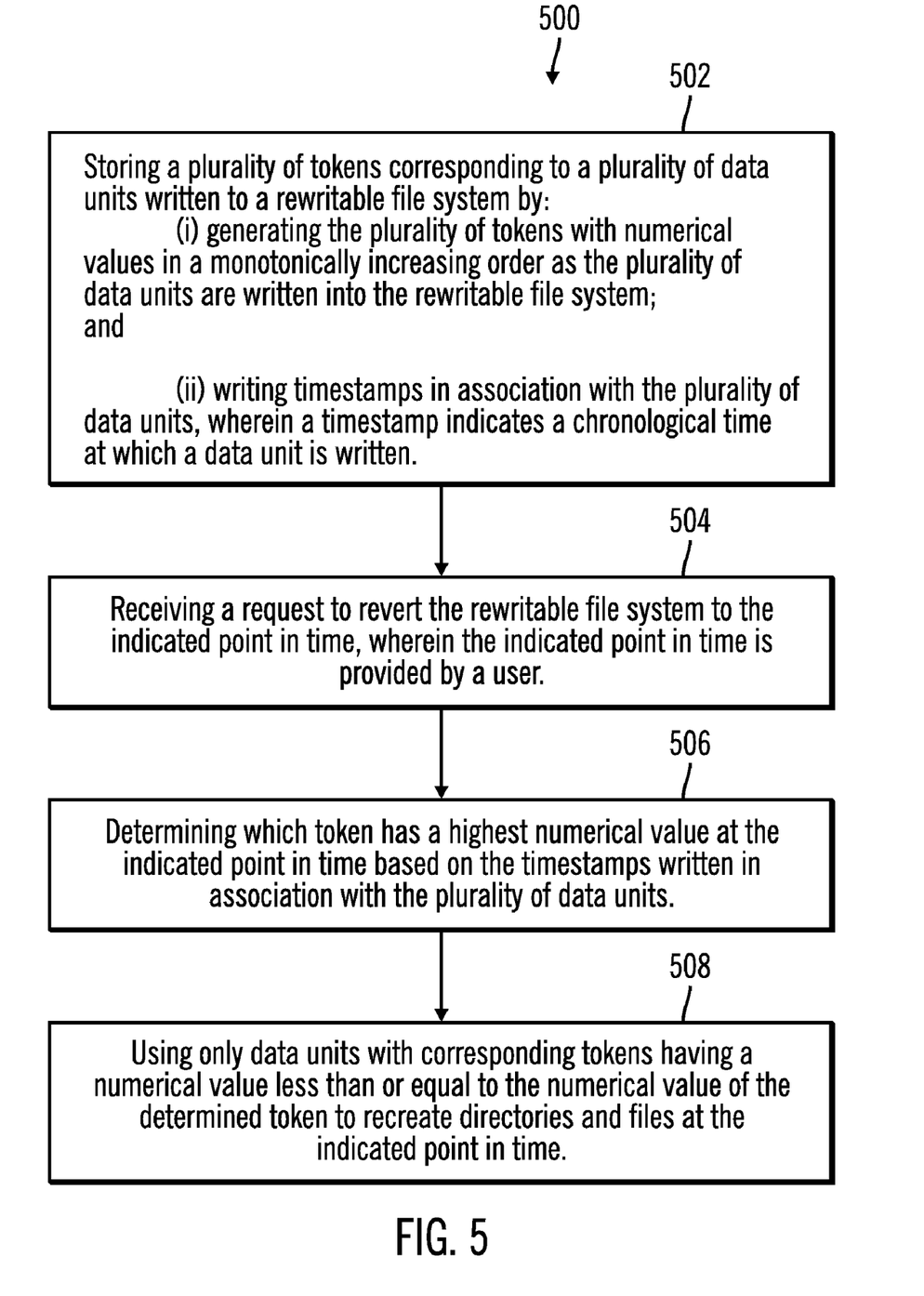
FIG. 5 illustrates third operations for reverting a rewritable file system to an earlier point in time, in accordance with certain embodiments.

FIG. 5 illustrates third operations 500 for reverting a rewritable file system to an earlier point in time, in accordance with certain embodiments. The third operations 500 may be implemented in the computational device 102.

Control starts at block 502, wherein a plurality of tokens 118a . . . 118n corresponding to a plurality of data units 116a . . . 116n is written to a rewritable file system 104 by:
(i) generating the plurality of tokens 118a . . . 118n with numerical values in a monotonically increasing order as the plurality of data units 116a . . . 116n are written into the rewritable file system 104; and
(ii) writing timestamps in association with the plurality of data units 116a . . . 116n, wherein a timestamp indicates a chronological time at which a data unit is written.

Control proceeds to block 504, where a request to revert the rewritable file system 104 to an indicated point in time is received, wherein the indicated point in time is provided by a user. A determination is made (at block 506) as to which token has a highest numerical value at the indicated point in time based on the timestamps written in association with the plurality of data units. For example, in the exemplary embodiment of FIG. 3, the determined token is token 308d with value 12,357.

The file system reversion application 112, uses (at block 508) only data units with corresponding tokens having a numerical value less than or equal to the numerical value of the determined token to recreate directories and files at the indicated point in time.

Therefore, FIG. 5 illustrates an exemplary embodiment in which a rewritable file system 104 is reverted to a state at a particular point in time by determining the numerically highest token at that particular point in time and using only data units with corresponding tokens having a numerical value less than or equal to the numerical value of the determined token to recreate directories and files in the at the indicated point in time.

Further Embodiments

Certain additional embodiments provide a "Time Based File System" (TBFS) that allows viewing of a file system as it was at any point in time (to the granularity of file commits) and the ability to restore a file system to that state. Embodiments to implement this may utilize Write Once Read Many (WORM) filesystem techniques to remove the copy of existing data before writing new data while providing greatly enhanced granularity of the "snapshots." This essentially provides a file system snapshot on every file commit without the performance impact. The trade off to accomplish this is disk space consumption in overhead and retention of all past data.

The "Time Based File System" is a new file system created by modifying an existing WORM file system driver to provide read-only mount viewing of a particular file system as it appears at a point-in-time (referred to as a "Point In Time Read Only Mount" PITROM), and perform operations to "Roll Back" the file system to a specified point-in-time making the current state of the file system the same as it was at the earlier point in time (and allowing it to be subsequently modified). WORM file system drivers already provide complete read/write file system semantics, including modification of existing files and logical delete of a file, by consuming new space. Certain embodiments provide the new functions that involve using a global file system token assigned to each metadata update (commit point) as a "logical clock" and to selectively ignore ranges of change in the file system over time.

Certain advantages of the "Time Based File System" (TBFS) over snapshot technology are:
(1) Snapshots do not have to scheduled or triggered. There is no distinct "snapshot" operation;
(2) The granularity of points in time that can be restored is greatly increased to any arbitrary point in time;
(3) The "Copy-on-Write" penalty is avoided;
(4) Even a "Roll-Back" of a "Roll-Back" can be performed; and
(5) Operating system clock changes (such as daylight saving time or user initiated changes to the operating system clock setting) do not cause problems to the TBFS since the file system tokens and not true timestamps are being used to track the changes in the file system.

WORM file systems or Read/Write file systems implementing versioning semantics may accomplish file update, logical file and directory delete, and any other update or change to the metadata or user data by writing a new copy of the metadata structure (such as directory entry/inode equivalent). All queries then involve searching all copies and only using the latest copy or selective earlier copies (for versioning). In the case of accomplishing the logical deletion of a file, the new copy of the directory entry/inode is written with a flag set to indicate a logical deletion has occurred and the file system driver then remembers to treat the metadata as if it doesn't exist. Data blocks belonging to files are never deleted but instead just hidden and new disk space is always used for any new user writes or updates to existing files. To track what copies of directory entries have been seen certain embodiments also assign a "file system token" to each copy of an entry. The token is a monotonically increasing (across the entire file system) integer. Each directory entry for a file has a field to carry its unique token value as well as the token value associated with the first instance of that file (termed original token).

To implement the point-in-time read and roll-back operations the existing file system search algorithms of a WORM file system driver (or Read/Write system with versioning) are modified to ignore certain ranges of tokens. A read-only mount of the file system at a certain point in time is accomplished by determining what token value was last assigned at the time of interest and then mounting the file system and remembering to ignore all directory entries with token values greater than that value. The "Roll-Back" or restore a file system to that point in time is accomplished by maintaining a range of token values to ignore on the current file system. The range in token values to ignore is the token value from the point-in-time to restore to the current token value at the time the roll back operations is performed. The roll back operation saves this range entry in the file system metadata and the entry is itself assigned a token value so future roll backs may undo it. During mount of a file system the driver scans this list from latest to earliest ranges ignoring earlier ranges if later ranges so indicate and when completed with mounting maintains a memory list of token ranges that may be ignored in operations.

In certain embodiments, the first step to a point-in-time read-only mount, PITROM, or a roll-back is to correlate user time to the token value assigned at that time to the granularity of last metadata update prior to that point in time (i.e., what was the token value assigned to meta-data update done prior to the user requested time.). This information is already available on the media within all the directory entries written as each has a timestamp and a token so the correlation between user time and tokens can be established. An on disk structure to store the ranges for roll-back operations is created. This may be another hidden system file that always has token range entries appended to it. This file is termed the "Hidden Token Ranges" file. Each entry contains the following: (a) token value for the entry ("my_token"); (b) beginning token of range to ignore ("begin_token"); and (c) ending token of range to ignore ("end_token"). These entries are never deleted, and new ones appended to the end of this "Hidden Token Ranges" system file. To "roll-back" a "roll-back" a new entry is added to the "Hidden Token Ranges" file whose range covers a previous range that represents an earlier roll-back operation.

On mount of the file system the driver reads the Hidden Token Ranges system file and processes the entries from the last-in-time (most recent) to the first-in-time (least recent) building an in memory structure of token ranges to be ignored. As it is processing, the latter token ranges may cause it to ignore earlier token ranges. In certain embodiments, when retrieving directory entries the file system search algorithms are modified to consult the in memory structure of token ranges to ignore and ignore file system entries if the token associated with the file system entry is within a hidden range.

Additional Embodiment Details

The described techniques may be implemented as a method, apparatus or article of manufacture involving software, firmware, micro-code, hardware and/or any combination thereof The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
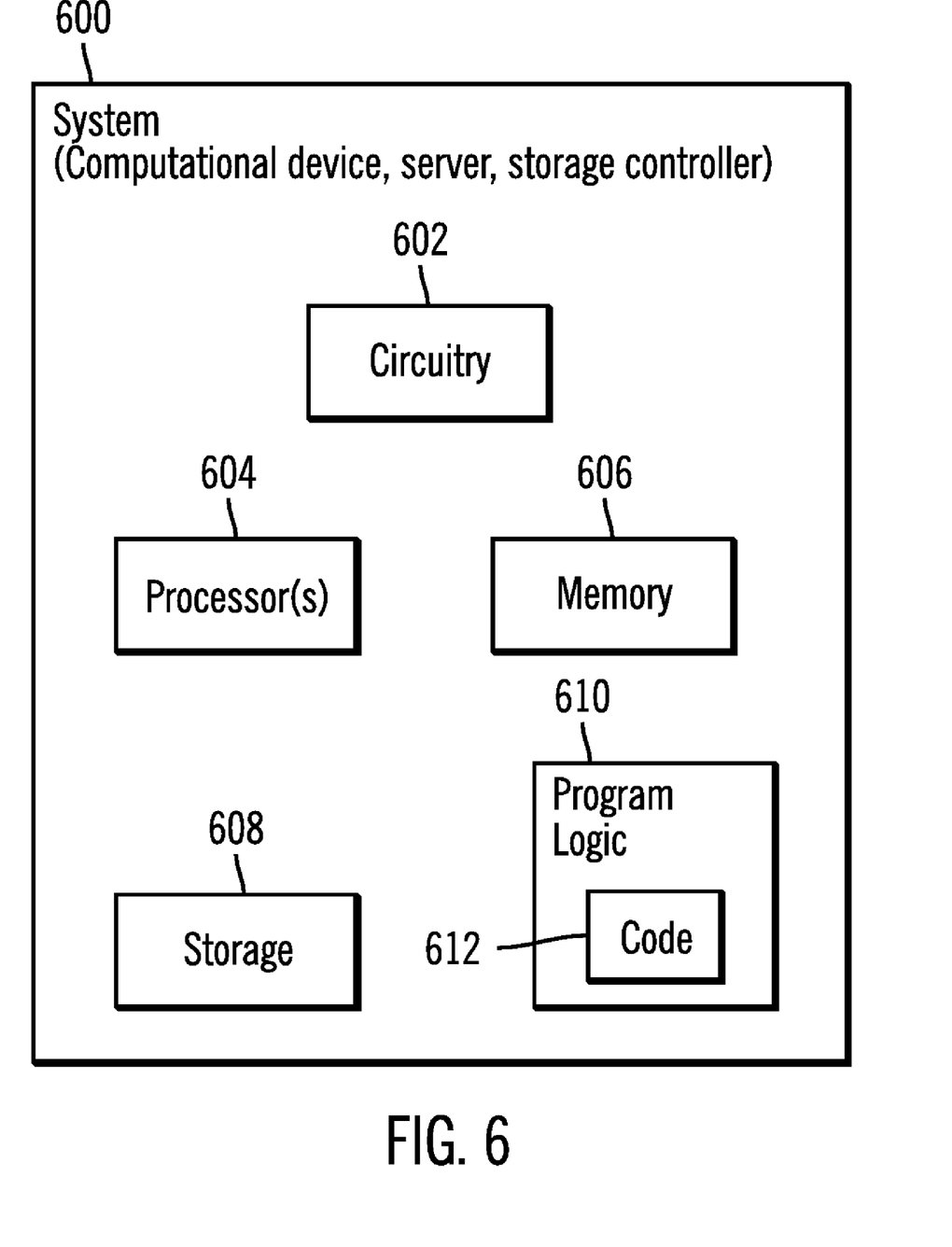
FIG. 6 illustrates a block diagram that shows certain elements that may be included in the computational device of the computing environment of FIG. 1, in accordance with certain embodiments.

FIG. 6 illustrates a block diagram that shows certain elements that may be included in the computational device 102 in accordance with certain embodiments. One or more of the computational devices 102 either individually or collectively may also be referred to as a system 600, and may include a circuitry 602 that may in certain embodiments include a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method comprising:
    storing a plurality of tokens corresponding to a plurality of data units written to a rewritable file system, wherein an ordering relationship is maintained among the plurality of tokens, wherein the ordering relationship is such that a first token corresponding to a first data unit is of a lesser numerical value in comparison to a second token corresponding to a second data unit, and wherein the first data unit is written at an earlier point in time in comparison to the second data unit, wherein the storing of the plurality of tokens further comprises:
        writing, in a first set of data structures, timestamps in association with the plurality of data units, wherein a timestamp indicates a chronological time at which a data unit is written; and
        generating, and writing in a second set of data structures, the plurality of tokens with numerical values in a monotonically increasing order as the plurality of data units are written into the rewritable file system; and
    reverting the rewritable file system to an indicated point in time based on the ordering relationship that is maintained among the stored plurality of tokens via the numerical values written in the monotonically increasing order in the second set of data structures.

2. The method of claim 1, wherein the reverting of the rewritable file system is unaffected by operating system clock changes as the ordering relationship maintained among the plurality of tokens and not time indicated in the timestamps is applied to revert the rewritable file system to the indicated point in time.

3. The method of claim 1, wherein the reverting further comprises:
    receiving a request to revert the rewritable file system to the indicated point in time, wherein the indicated point in time is provided by a user;
    determining which token has a highest numerical value at the indicated point in time based on the timestamps written in association with the plurality of data units; and
    using only data units with corresponding tokens having a numerical value less than or equal to the numerical value of the determined token to recreate directories and files at the indicated point in time.

4. The method of claim 1, wherein the storing and reverting are performed by a file system driver, and wherein the file system driver comprises:
    a token generator application that generates the plurality of tokens having monotonically increasing numerical values;
    a data unit writing application that writes the plurality of data units to a storage device and associates the plurality of data units with the plurality of tokens;
    a token to user time association application that determines which token has a highest numerical value corresponding to the indicated point in time; and
    a file system reversion application that reverts the rewritable file system to the indicated point in time by using a selected set of tokens of the plurality of tokens.

5. The method of claim 1, wherein a device on which the rewritable file system is implemented is selected from one of a write once read many storage device and a rewritable storage device, wherein no data that has been written can be physically deleted from the write once read many storage device, wherein data that has been written can be physically deleted from the rewritable storage device, and wherein continuous data protection is provided by allowing the rewritable file system to be reverted to any prior point in time.

6. A system, comprising:
    a memory; and
    a processor coupled to the memory, wherein the processor performs operations, the operations comprising:
        (i) storing a plurality of tokens corresponding to a plurality of data units written to a rewritable file system, wherein an ordering relationship is maintained among the plurality of tokens, wherein the ordering relationship is such that a first token corresponding to a first data unit is of a lesser numerical value in comparison to a second token corresponding to a second data unit, and wherein the first data unit is written at an earlier point in time in comparison to the second data unit, wherein the storing of the plurality of tokens further comprises:
            writing, in a first set of data structures, timestamps in association with the plurality of data units, wherein a timestamp indicates a chronological time at which a data unit is written; and
            generating, and writing in a second set of data structures, the plurality of tokens with numerical values in a monotonically increasing order as the plurality of data units are written into the rewritable file system; and
        (ii) reverting the rewritable file system to an indicated point in time based on the ordering relationship that is maintained among the stored plurality of tokens via the numerical values written in the monotonically increasing order in the second set of data structures.

7. The system of claim 6, wherein the reverting of the rewritable file system is unaffected by operating system clock changes as the ordering relationship maintained among the plurality of tokens and not time indicated in the timestamps is applied to revert the rewritable file system to the indicated point in time.

8. The system of claim 6, wherein the reverting further comprises:
    receiving a request to revert the rewritable file system to the indicated point in time, wherein the indicated point in time is provided by a user;
    determining which token has a highest numerical value at the indicated point in time based on the timestamps written in association with the plurality of data units; and
    using only data units with corresponding tokens having a numerical value less than or equal to the numerical value of the determined token to recreate directories and files at the indicated point in time.

9. The system of claim 6, wherein the storing and reverting are performed by a file system driver, and wherein the file system driver comprises:
- a token generator application that generates the plurality of tokens having monotonically increasing numerical values;
- a data unit writing application that writes the plurality of data units to a storage device and associates the plurality of data units with the plurality of tokens;
- a token to user time association application that determines which token has a highest numerical value corresponding to the indicated point in time; and
- a file system reversion application that reverts the rewritable file system to the indicated point in time by using a selected set of tokens of the plurality of tokens.

10. The system of claim 6, wherein a device on which the rewritable file system is implemented is selected from one of a write once read many storage device and a rewritable storage device, wherein no data that has been written can be physically deleted from the write once read many storage device, wherein data that has been written can be physically deleted from the rewritable storage device, and wherein continuous data protection is provided by allowing the rewritable file system to be reverted to any prior point in time.

11. An article of manufacture, wherein code is stored in the article of manufacture, and wherein the code when executed on a processor causes operations, the operations comprising:
- storing a plurality of tokens corresponding to a plurality of data units written to a rewritable file system, wherein an ordering relationship is maintained among the plurality of tokens, wherein the ordering relationship is such that a first token corresponding to a first data unit is of a lesser numerical value in comparison to a second token corresponding to a second data unit, and wherein the first data unit is written at an earlier point in time in comparison to the second data unit, wherein the storing of the plurality of tokens further comprises:
  - writing, in a first set of data structures, timestamps in association with the plurality of data units, wherein a timestamp indicates a chronological time at which a data unit is written; and
  - generating, and writing in a second set of data structures, the plurality of tokens with numerical values in a monotonically increasing order as the plurality of data units are written into the rewritable file system; and
- reverting the rewritable file system to an indicated point in time based on the ordering relationship that is maintained among the stored plurality of tokens via the numerical values written in the monotonically increasing order in the second set of data structures.

12. The article of manufacture of claim 11, wherein the reverting of the rewritable file system is unaffected by operating system clock changes as the ordering relationship maintained among the plurality of tokens and not time indicated in the timestamps is applied to revert the rewritable file system to the indicated point in time.

13. The article of manufacture of claim 11, wherein the reverting further comprises:
- receiving a request to revert the rewritable file system to the indicated point in time, wherein the indicated point in time is provided by a user;
- determining which token has a highest numerical value at the indicated point in time based on the timestamps written in association with the plurality of data units; and
- using only data units with corresponding tokens having a numerical value less than or equal to the numerical value of the determined token to recreate directories and files at the indicated point in time.

14. The article of manufacture of claim 11, wherein the storing and reverting are performed by a file system driver, and wherein the file system driver comprises:
- a token generator application that generates the plurality of tokens having monotonically increasing numerical values;
- a data unit writing application that writes the plurality of data units to a storage device and associates the plurality of data units with the plurality of tokens;
- a token to user time association application that determines which token has a highest numerical value corresponding to the indicated point in time; and
- a file system reversion application that reverts the rewritable file system to the indicated point in time by using a selected set of tokens of the plurality of tokens.

15. The article of manufacture of claim 11, wherein a device on which the rewritable file system is implemented is selected from one of a write once read many storage device and a rewritable storage device, wherein no data that has been written can be physically deleted from the write once read many storage device, wherein data that has been written can be physically deleted from the rewritable storage device, and wherein continuous data protection is provided by allowing the rewritable file system to be reverted to any prior point in time.

16. A method for deploying computing infrastructure, comprising integrating machine-readable code into a machine, wherein the code in combination with the machine is capable of performing:
- storing a plurality of tokens corresponding to a plurality of data units written to a rewritable file system, wherein an ordering relationship is maintained among the plurality of tokens, wherein the ordering relationship is such that a first token corresponding to a first data unit is of a lesser numerical value in comparison to a second token corresponding to a second data unit, and wherein the first data unit is written at an earlier point in time in comparison to the second data unit, wherein the storing of the plurality of tokens further comprises:
  - writing, in a first set of data structures, timestamps in association with the plurality of data units, wherein a timestamp indicates a chronological time at which a data unit is written; and
  - generating, and writing in a second set of data structures, the plurality of tokens with numerical values in a monotonically increasing order as the plurality of data units are written into the rewritable file system; and
- reverting the rewritable file system to an indicated point in time based on the ordering relationship that is maintained among the stored plurality of tokens via the numerical values written in the monotonically increasing order in the second set of data structures.

17. The method for deploying computing infrastructure of claim 16, wherein the reverting of the rewritable file system is unaffected by operating system clock changes as the ordering relationship maintained among the plurality of tokens and not time indicated in the timestamps is applied to revert the rewritable file system to the indicated point in time.

18. The method for deploying computing infrastructure of claim 16, wherein the reverting further comprises:
- receiving a request to revert the rewritable file system to the indicated point in time, wherein the indicated point in time is provided by a user;

determining which token has a highest numerical value at the indicated point in time based on the timestamps written in association with the plurality of data units; and using only data units with corresponding tokens having a numerical value less than or equal to the numerical value of the determined token to recreate directories and files at the indicated point in time.

19. The method for deploying computing infrastructure of claim 16, wherein the storing and reverting are performed by a file system driver, and wherein the file system driver comprises:

a token generator application that generates the plurality of tokens having monotonically increasing numerical values;

a data unit writing application that writes the plurality of data units to a storage device and associates the plurality of data units with the plurality of tokens;

a token to user time association application that determines which token has a highest numerical value corresponding to the indicated point in time; and a file system reversion application that reverts the rewritable file system to the indicated point in time by using a selected set of tokens of the plurality of tokens.

20. The method for deploying computing infrastructure of claim 16, wherein a device on which the rewritable file system is implemented is selected from one of a write once read many storage device and a rewritable storage device, wherein no data that has been written can be physically deleted from the write once read many storage device, wherein data that has been written can be physically deleted from the rewritable storage device, and wherein continuous data protection is provided by allowing the rewritable file system to be reverted to any prior point in time.

* * * * *